(12) United States Patent
Yonge, III

(10) Patent No.: US 8,416,887 B2
(45) Date of Patent: Apr. 9, 2013

(54) MANAGING SPECTRA OF MODULATED SIGNALS IN A COMMUNICATION NETWORK

(75) Inventor: Lawrence W. Yonge, III, Summerfield, FL (US)

(73) Assignee: Qualcomm Atheros, Inc, San Jose, CA (US)

( * ) Notice: Subject to any disclaimer, the term of this patent is extended or adjusted under 35 U.S.C. 154(b) by 0 days.

(21) Appl. No.: 13/219,863

(22) Filed: Aug. 29, 2011

(65) Prior Publication Data

US 2011/0310953 A1    Dec. 22, 2011

Related U.S. Application Data

(63) Continuation of application No. 11/493,382, filed on Jul. 26, 2006, now Pat. No. 8,175,190.

(60) Provisional application No. 60/702,717, filed on Jul. 27, 2005, provisional application No. 60/705,720, filed on Aug. 2, 2005.

(51) Int. Cl.
*H03K 9/00* (2006.01)
*H04L 27/00* (2006.01)

(52) U.S. Cl.
USPC ........... 375/316; 375/135; 375/141; 375/146; 375/296

(58) Field of Classification Search .................. 375/135, 375/141, 146, 285, 296, 316; 370/203–211
See application file for complete search history.

(56) References Cited

U.S. PATENT DOCUMENTS

| | | |
|---|---|---|
| 3,806,885 A | 4/1974 | Moore |
| 4,569,044 A | 2/1986 | Tao et al. |
| 4,581,734 A | 4/1986 | Olson et al. |
| 4,630,261 A | 12/1986 | Irvin |
| 4,677,612 A | 6/1987 | Olson et al. |
| 4,682,324 A | 7/1987 | Ulug |
| 4,720,850 A | 1/1988 | Oberlander et al. |
| 4,726,018 A | 2/1988 | Bux et al. |
| 4,792,947 A | 12/1988 | Takiyasu et al. |
| 4,819,229 A | 4/1989 | Pritty et al. |

(Continued)

FOREIGN PATENT DOCUMENTS

| | | |
|---|---|---|
| DE | 3413144 A1 | 10/1985 |
| EP | 0571005 A2 | 11/1993 |

(Continued)

OTHER PUBLICATIONS

'Initialization Vector' Wikipedia, the Free Encyclopedia [online] [retrieved on Jun. 21, 2006] <URL: http://en.wikipedia.org/wiki/Initialization.sub.--vector>.

(Continued)

*Primary Examiner* — Curtis Odom
(74) *Attorney, Agent, or Firm* — DeLizio Gilliam, PLLC

(57) ABSTRACT

Information is modulated onto frequency components of a signal. The resulting modulated signal includes at least some redundancy in frequency enabling a portion of the information modulated onto selected frequency components to be recovered from fewer than all of the selected frequency components. Controlling the spectrum of the modulated signal includes enabling the amplitude of at least some frequency components of the modulated signal to be set below a predetermined amplitude used for modulating the information.

27 Claims, 3 Drawing Sheets

U.S. PATENT DOCUMENTS

| | | |
|---|---|---|
| 4,881,241 A | 11/1989 | Pommier et al. |
| 4,943,959 A | 7/1990 | Arnold |
| 4,977,593 A | 12/1990 | Ballance |
| 5,001,472 A | 3/1991 | Fischer et al. |
| 5,003,539 A | 3/1991 | Takemoto et al. |
| 5,046,069 A | 9/1991 | Calvignac et al. |
| 5,081,678 A | 1/1992 | Kaufman et al. |
| 5,105,423 A | 4/1992 | Tanaka et al. |
| 5,121,396 A | 6/1992 | Irvin et al. |
| 5,140,584 A | 8/1992 | Suzuki |
| 5,142,578 A | 8/1992 | Matyas et al. |
| 5,157,659 A | 10/1992 | Schenkel |
| 5,185,796 A | 2/1993 | Wilson |
| 5,197,061 A | 3/1993 | Halbert-Lassalle et al. |
| 5,204,903 A | 4/1993 | Okada et al. |
| 5,214,646 A | 5/1993 | Yacoby |
| 5,228,025 A | 7/1993 | Le Floch et al. |
| 5,231,634 A | 7/1993 | Giles et al. |
| 5,249,184 A | 9/1993 | Woest et al. |
| 5,274,629 A | 12/1993 | Helard et al. |
| 5,280,480 A | 1/1994 | Pitt et al. |
| 5,297,275 A | 3/1994 | Thayer |
| 5,307,376 A | 4/1994 | Castelain et al. |
| 5,339,313 A | 8/1994 | Ben-Michael et al. |
| 5,343,473 A | 8/1994 | Cidon et al. |
| 5,359,625 A | 10/1994 | Vander Mey et al. |
| 5,384,777 A | 1/1995 | Ahmadi et al. |
| 5,416,801 A | 5/1995 | Chouly et al. |
| 5,426,646 A | 6/1995 | Slack |
| RE35,001 E | 7/1995 | Grow |
| 5,432,848 A | 7/1995 | Butter et al. |
| 5,436,905 A | 7/1995 | Li et al. |
| 5,448,565 A | 9/1995 | Chang et al. |
| 5,452,288 A | 9/1995 | Rahuel et al. |
| 5,452,322 A | 9/1995 | Lauer |
| 5,473,602 A | 12/1995 | McKenna et al. |
| 5,481,535 A | 1/1996 | Hershey |
| 5,483,529 A | 1/1996 | Baggen et al. |
| 5,488,632 A | 1/1996 | Mason et al. |
| 5,504,747 A | 4/1996 | Sweazey |
| 5,515,379 A | 5/1996 | Crisler et al. |
| 5,524,027 A | 6/1996 | Huisken |
| 5,537,414 A | 7/1996 | Takiyasu et al. |
| 5,541,922 A | 7/1996 | Pyhalammi |
| 5,548,649 A | 8/1996 | Jacobson |
| 5,555,268 A | 9/1996 | Fattouche et al. |
| 5,563,883 A | 10/1996 | Cheng |
| 5,563,897 A | 10/1996 | Pyndiah et al. |
| 5,568,476 A | 10/1996 | Sherer et al. |
| 5,610,908 A | 3/1997 | Shelswell et al. |
| 5,612,975 A | 3/1997 | Becker et al. |
| 5,615,212 A | 3/1997 | Ruszczyk et al. |
| 5,619,651 A | 4/1997 | Young |
| 5,623,512 A | 4/1997 | Sasaki |
| 5,629,942 A | 5/1997 | Zijderhand |
| 5,629,948 A | 5/1997 | Hagiwara et al. |
| 5,636,230 A | 6/1997 | Marturano et al. |
| 5,644,576 A | 7/1997 | Bauchot et al. |
| 5,651,009 A | 7/1997 | Perreault et al. |
| 5,694,389 A | 12/1997 | Seki et al. |
| 5,706,348 A | 1/1998 | Gray et al. |
| 5,717,689 A | 2/1998 | Ayanoglu |
| 5,732,113 A | 3/1998 | Schmidl et al. |
| 5,737,330 A | 4/1998 | Fulthorp et al. |
| 5,745,769 A | 4/1998 | Choi |
| 5,757,766 A | 5/1998 | Sugita |
| 5,757,770 A | 5/1998 | Lagoutte et al. |
| 5,764,931 A | 6/1998 | Schmahl et al. |
| 5,771,235 A | 6/1998 | Tang et al. |
| 5,787,071 A | 7/1998 | Basso et al. |
| 5,790,541 A | 8/1998 | Patrick et al. |
| 5,793,307 A | 8/1998 | Perreault et al. |
| 5,793,861 A | 8/1998 | Haigh |
| 5,799,033 A | 8/1998 | Baggen |
| 5,812,599 A | 9/1998 | Van Kerckhove |
| 5,818,821 A | 10/1998 | Schurig |
| 5,818,826 A | 10/1998 | Gfeller et al. |
| 5,825,807 A | 10/1998 | Kumar |
| 5,828,677 A | 10/1998 | Sayeed et al. |
| 5,841,778 A | 11/1998 | Shaffer et al. |
| 5,841,873 A | 11/1998 | Lockhart et al. |
| 5,884,040 A | 3/1999 | Chung |
| 5,886,993 A | 3/1999 | Ruszczyk et al. |
| 5,887,063 A | 3/1999 | Varadharajan et al. |
| 5,892,769 A | 4/1999 | Lee |
| 5,896,561 A | 4/1999 | Schrader et al. |
| 5,903,614 A | 5/1999 | Suzuki et al. |
| 5,914,932 A | 6/1999 | Suzuki et al. |
| 5,914,959 A | 6/1999 | Marchetto et al. |
| 5,940,399 A | 8/1999 | Weizman |
| 5,940,438 A | 8/1999 | Poon et al. |
| 5,948,060 A | 9/1999 | Gregg et al. |
| 5,956,338 A | 9/1999 | Ghaibeh |
| 5,966,412 A | 10/1999 | Ramaswamy |
| 5,970,062 A | 10/1999 | Bauchot |
| 5,987,011 A | 11/1999 | Toh |
| 5,987,331 A | 11/1999 | Grube et al. |
| 6,005,894 A | 12/1999 | Kumar |
| 6,006,017 A | 12/1999 | Joshi et al. |
| 6,028,933 A | 2/2000 | Heer et al. |
| 6,035,000 A | 3/2000 | Bingham |
| 6,041,063 A | 3/2000 | Povlsen et al. |
| 6,041,358 A | 3/2000 | Huang et al. |
| 6,044,154 A | 3/2000 | Kelly |
| 6,044,482 A | 3/2000 | Wong |
| 6,052,377 A | 4/2000 | Ohmi et al. |
| 6,055,316 A | 4/2000 | Perlman et al. |
| 6,074,086 A | 6/2000 | Yonge, III |
| 6,076,115 A | 6/2000 | Sambamurthy et al. |
| 6,092,214 A | 7/2000 | Quoc et al. |
| 6,097,703 A | 8/2000 | Larsen et al. |
| 6,097,817 A | 8/2000 | Bilgic et al. |
| 6,098,179 A | 8/2000 | Harter, Jr. |
| 6,108,713 A | 8/2000 | Sambamurthy et al. |
| 6,111,919 A | 8/2000 | Yonge, III |
| 6,125,150 A | 9/2000 | Wesel et al. |
| 6,130,887 A | 10/2000 | Dutta |
| 6,130,894 A | 10/2000 | Ojard et al. |
| 6,151,296 A | 11/2000 | Vijayan et al. |
| 6,160,443 A | 12/2000 | Maalej et al. |
| 6,169,744 B1 | 1/2001 | Grabelsky et al. |
| 6,172,615 B1 | 1/2001 | Kogure |
| 6,172,616 B1 | 1/2001 | Johnson et al. |
| 6,182,147 B1 | 1/2001 | Farinacci |
| 6,188,717 B1 | 2/2001 | Kaiser et al. |
| 6,192,397 B1 | 2/2001 | Thompson |
| 6,202,082 B1 | 3/2001 | Tomizawa et al. |
| 6,215,792 B1 | 4/2001 | Abi-Nassif |
| 6,216,244 B1 | 4/2001 | Myers et al. |
| 6,222,851 B1 | 4/2001 | Petry |
| 6,222,873 B1 | 4/2001 | Bang et al. |
| 6,243,386 B1 | 6/2001 | Chan et al. |
| 6,243,449 B1 | 6/2001 | Margulis et al. |
| 6,246,770 B1 | 6/2001 | Stratton et al. |
| 6,252,849 B1 | 6/2001 | Rom et al. |
| 6,259,696 B1 | 7/2001 | Yazaki et al. |
| 6,263,445 B1 | 7/2001 | Blumenau |
| 6,269,132 B1 | 7/2001 | Yonge, III |
| 6,278,357 B1 | 8/2001 | Croushore et al. |
| 6,278,685 B1 | 8/2001 | Yonge, III et al. |
| 6,278,716 B1 | 8/2001 | Rubenstein et al. |
| 6,279,716 B1 | 8/2001 | Kayatani et al. |
| 6,289,000 B1 | 9/2001 | Yonge, III |
| 6,295,296 B1 | 9/2001 | Tappan |
| 6,334,185 B1 | 12/2001 | Hansson et al. |
| 6,343,083 B1 | 1/2002 | Mendelson et al. |
| 6,363,052 B1 | 3/2002 | Hosein |
| 6,370,156 B2 | 4/2002 | Spruyt et al. |
| 6,385,672 B1 | 5/2002 | Wang et al. |
| 6,397,368 B1 | 5/2002 | Yonge, III |
| 6,421,725 B1 | 7/2002 | Vermilyea et al. |
| 6,430,192 B1 | 8/2002 | Creedon et al. |
| 6,430,661 B1 | 8/2002 | Larson et al. |
| 6,434,153 B1 | 8/2002 | Yazaki et al. |
| 6,442,129 B1 | 8/2002 | Yonge, III |
| 6,445,717 B1 | 9/2002 | Gibson et al. |
| 6,456,649 B1 | 9/2002 | Isaksson et al. |

| | | | | | |
|---|---|---|---|---|---|
| 6,466,580 B1 | 10/2002 | Leung | 2001/0048692 A1 | 12/2001 | Karner |
| 6,469,992 B1 | 10/2002 | Schieder | 2002/0001314 A1 | 1/2002 | Yi et al. |
| 6,473,435 B1 | 10/2002 | Zhou et al. | 2002/0012320 A1 | 1/2002 | Ogier et al. |
| 6,480,489 B1 | 11/2002 | Muller et al. | 2002/0015423 A1 | 2/2002 | Rakib et al. |
| 6,487,212 B1 | 11/2002 | Erimli et al. | 2002/0015466 A1 | 2/2002 | Akiba et al. |
| 6,501,760 B1 | 12/2002 | Ohba et al. | 2002/0015477 A1 | 2/2002 | Geile et al. |
| 6,519,263 B1 | 2/2003 | Huth | 2002/0027897 A1 | 3/2002 | Moulsley et al. |
| 6,526,451 B2 | 2/2003 | Kasper | 2002/0042836 A1 | 4/2002 | Mallory |
| 6,526,581 B1 | 2/2003 | Edson | 2002/0048368 A1 | 4/2002 | Gardner |
| 6,538,985 B1 | 3/2003 | Petry et al. | 2002/0061031 A1 | 5/2002 | Sugar et al. |
| 6,553,534 B2 | 4/2003 | Yonge, III | 2002/0065047 A1 | 5/2002 | Moose |
| 6,559,757 B1 | 5/2003 | Deller et al. | 2002/0105901 A1 | 8/2002 | Chini et al. |
| 6,567,416 B1 | 5/2003 | Chuah | 2002/0107023 A1 | 8/2002 | Chari et al. |
| 6,567,914 B1 | 5/2003 | Just et al. | 2002/0115458 A1 | 8/2002 | Mizuno et al. |
| 6,577,231 B2 | 6/2003 | Litwin, Jr. et al. | 2002/0116342 A1 | 8/2002 | Hirano et al. |
| 6,587,453 B1 | 7/2003 | Romans et al. | 2002/0131591 A1 | 9/2002 | Henson et al. |
| 6,587,474 B1 | 7/2003 | Griessbach | 2002/0137462 A1 | 9/2002 | Rankin |
| 6,594,268 B1 | 7/2003 | Aukia et al. | 2002/0150249 A1 | 10/2002 | Ohkita et al. |
| 6,647,250 B1 | 11/2003 | Bultman et al. | 2002/0163933 A1 | 11/2002 | Benveniste |
| 6,654,410 B2 | 11/2003 | Tzannes | 2002/0191533 A1 | 12/2002 | Chini et al. |
| 6,667,991 B1 | 12/2003 | Tzannes | 2003/0006883 A1 | 1/2003 | Kim et al. |
| 6,671,284 B1 | 12/2003 | Yonge, III | 2003/0012166 A1 | 1/2003 | Benveniste |
| 6,747,976 B1 | 6/2004 | Bensaou et al. | 2003/0016123 A1 | 1/2003 | Tager et al. |
| 6,759,946 B2 | 7/2004 | Sahinoglu et al. | 2003/0038710 A1 | 2/2003 | Manis et al. |
| 6,765,885 B2 | 7/2004 | Jiang et al. | 2003/0039257 A1 | 2/2003 | Manis et al. |
| 6,775,280 B1 | 8/2004 | Ma et al. | 2003/0048183 A1 | 3/2003 | Vollmer et al. |
| 6,778,507 B1 | 8/2004 | Jalali | 2003/0051146 A1 | 3/2003 | Ebina et al. |
| 6,782,476 B1 | 8/2004 | Ishibashi | 2003/0053493 A1 | 3/2003 | Graham Mobley et al. |
| 6,807,146 B1 | 10/2004 | McFarland | 2003/0056014 A1 | 3/2003 | Verberkt et al. |
| 6,834,091 B2 | 12/2004 | Litwin, Jr. et al. | 2003/0066082 A1 | 4/2003 | Kliger et al. |
| 6,882,634 B2 | 4/2005 | Bagchi et al. | 2003/0071721 A1 | 4/2003 | Manis et al. |
| 6,888,844 B2 | 5/2005 | Mallory et al. | 2003/0079169 A1 | 4/2003 | Ho et al. |
| 6,901,064 B2 | 5/2005 | Cain et al. | 2003/0086437 A1 | 5/2003 | Benveniste |
| 6,907,044 B1 | 6/2005 | Yonge, III | 2003/0107476 A1 | 6/2003 | Sahinoglu et al. |
| 6,909,723 B1 | 6/2005 | Yonge, III | 2003/0133427 A1 | 7/2003 | Cimini, Jr. et al. |
| 6,952,399 B1 | 10/2005 | Bayerl et al. | 2003/0133473 A1 | 7/2003 | Manis et al. |
| 6,985,072 B2 | 1/2006 | Omidi et al. | 2003/0137993 A1 | 7/2003 | Odman |
| 7,000,031 B2 | 2/2006 | Fischer et al. | 2003/0174664 A1 | 9/2003 | Benveniste |
| 7,085,284 B1 | 8/2006 | Negus | 2003/0181204 A1 | 9/2003 | Benveniste |
| 7,200,147 B2 | 4/2007 | Shin et al. | 2003/0198246 A1 | 10/2003 | Lifshitz et al. |
| 7,206,320 B2 | 4/2007 | Iwamura | 2003/0203716 A1 | 10/2003 | Takahashi et al. |
| 7,212,513 B2 | 5/2007 | Gassho et al. | 2003/0217182 A1 | 11/2003 | Liu et al. |
| 7,218,901 B1 | 5/2007 | Mobley et al. | 2003/0227934 A1 | 12/2003 | White et al. |
| 7,233,804 B2 | 6/2007 | Sugaya et al. | 2003/0231607 A1 | 12/2003 | Scanlon et al. |
| 7,242,932 B2 | 7/2007 | Wheeler et al. | 2003/0231652 A1 | 12/2003 | Sprague et al. |
| 7,274,792 B2 | 9/2007 | Chin et al. | 2003/0231658 A1 | 12/2003 | Liang et al. |
| 7,280,517 B2 | 10/2007 | Benveniste | 2003/0231715 A1 | 12/2003 | Shoemake et al. |
| 7,298,706 B2 | 11/2007 | Yoshida et al. | 2004/0001499 A1 | 1/2004 | Patella et al. |
| 7,307,357 B2 | 12/2007 | Kopp | 2004/0008728 A1 | 1/2004 | Lee |
| 7,315,524 B2 | 1/2008 | Ohmi et al. | 2004/0009783 A1 | 1/2004 | Miyoshi |
| 7,330,457 B2 | 2/2008 | Panwar et al. | 2004/0010736 A1 | 1/2004 | Alapuranen |
| 7,339,457 B2 | 3/2008 | Trochesset | 2004/0013135 A1 | 1/2004 | Haddad |
| 7,342,896 B2 | 3/2008 | Ayyagari | 2004/0037248 A1 | 2/2004 | Tamaki et al. |
| 7,352,770 B1 | 4/2008 | Yonge, III | 2004/0047319 A1 | 3/2004 | Elg |
| 7,356,010 B2 | 4/2008 | He et al. | 2004/0047351 A1 | 3/2004 | Del Prado Pavon et al. |
| 7,359,398 B2 | 4/2008 | Sugaya | 2004/0064509 A1 | 4/2004 | Ayyagari et al. |
| 7,369,579 B2 | 5/2008 | Logvinov et al. | 2004/0066783 A1 | 4/2004 | Ayyagari |
| 7,388,853 B2 | 6/2008 | Ptasinski et al. | 2004/0070912 A1 | 4/2004 | Kopp |
| 7,423,992 B2 | 9/2008 | Iwamura | 2004/0075535 A1 | 4/2004 | Propp et al. |
| 7,457,306 B2 | 11/2008 | Watanabe et al. | 2004/0077338 A1 | 4/2004 | Hsu et al. |
| 7,496,078 B2 | 2/2009 | Rahman | 2004/0081089 A1 | 4/2004 | Ayyagari et al. |
| 7,506,042 B2 | 3/2009 | Ayyagari | 2004/0083362 A1 | 4/2004 | Park et al. |
| 7,519,030 B2 | 4/2009 | Cimini, Jr. et al. | 2004/0122531 A1 | 6/2004 | Atsuta et al. |
| 7,522,630 B2 | 4/2009 | Ho et al. | 2004/0136396 A1 | 7/2004 | Yonge, III |
| 7,551,606 B2 | 6/2009 | Iwamura | 2004/0141523 A1 | 7/2004 | Bhushan et al. |
| 7,558,294 B2 | 7/2009 | Yonge, III | 2004/0141548 A1* | 7/2004 | Shattil ........................ 375/146 |
| 7,623,542 B2 | 11/2009 | Yonge, III | 2004/0165532 A1 | 8/2004 | Poor et al. |
| 7,664,145 B2 | 2/2010 | Akamatsu et al. | 2004/0165728 A1 | 8/2004 | Crane et al. |
| 7,684,568 B2 | 3/2010 | Yonge, III | 2004/0174851 A1 | 9/2004 | Zalitzky et al. |
| 7,684,756 B2 | 3/2010 | Bohnke et al. | 2004/0184427 A1 | 9/2004 | Lynch et al. |
| 7,729,372 B2 | 6/2010 | Yonge, III | 2004/0184481 A1 | 9/2004 | Lee |
| 7,822,059 B2 | 10/2010 | Katar et al. | 2004/0186994 A1 | 9/2004 | Herbert et al. |
| 7,856,008 B2 | 12/2010 | Ayyagari et al. | 2004/0208139 A1 | 10/2004 | Iwamura |
| 7,894,487 B2 | 2/2011 | Yonge, III et al. | 2004/0214570 A1 | 10/2004 | Zhang et al. |
| 7,904,021 B2 | 3/2011 | Yonge, III | 2004/0218577 A1 | 11/2004 | Nguyen et al. |
| 8,089,901 B2 | 1/2012 | Yonge, III | 2004/0250159 A1 | 12/2004 | Tober et al. |
| 8,090,857 B2 | 1/2012 | Yonge, III | 2004/0264557 A1 | 12/2004 | Maruyama |
| 8,175,190 B2 | 5/2012 | Yonge, III | 2005/0001694 A1 | 1/2005 | Berkman |
| 2001/0043576 A1 | 11/2001 | Terry | 2005/0015805 A1 | 1/2005 | Iwamura |

| | | | |
|---|---|---|---|
| 2005/0025176 A1 | 2/2005 | Ko et al. |
| 2005/0033960 A1 | 2/2005 | Vialen et al. |
| 2005/0041588 A1 | 2/2005 | Kim et al. |
| 2005/0041673 A1 | 2/2005 | Jiang et al. |
| 2005/0053066 A1 | 3/2005 | Famolari |
| 2005/0058089 A1 | 3/2005 | Vijayan et al. |
| 2005/0063402 A1 | 3/2005 | Rosengard et al. |
| 2005/0078803 A1 | 4/2005 | Wakisaka et al. |
| 2005/0089062 A1 | 4/2005 | Zegelin |
| 2005/0099938 A1 | 5/2005 | Sarraf et al. |
| 2005/0122994 A1 | 6/2005 | Mangin et al. |
| 2005/0124293 A1 | 6/2005 | Alicherry et al. |
| 2005/0135312 A1 | 6/2005 | Montojo et al. |
| 2005/0135403 A1 | 6/2005 | Ketchum et al. |
| 2005/0147075 A1 | 7/2005 | Terry |
| 2005/0149649 A1 | 7/2005 | Carneal et al. |
| 2005/0149757 A1 | 7/2005 | Corbett et al. |
| 2005/0163067 A1 | 7/2005 | Okamoto et al. |
| 2005/0169222 A1 | 8/2005 | Ayyagari et al. |
| 2005/0170835 A1 | 8/2005 | Ayyagari et al. |
| 2005/0174950 A1 | 8/2005 | Ayyagari |
| 2005/0180453 A1 | 8/2005 | Gaskill |
| 2005/0190785 A1 | 9/2005 | Yonge, III |
| 2005/0192011 A1 | 9/2005 | Hong et al. |
| 2005/0193116 A1 | 9/2005 | Ayyagari et al. |
| 2005/0243765 A1 | 11/2005 | Schrader et al. |
| 2005/0276276 A1 | 12/2005 | Davis |
| 2006/0007907 A1 | 1/2006 | Shao et al. |
| 2006/0077997 A1 | 4/2006 | Yamaguchi et al. |
| 2006/0083205 A1 | 4/2006 | Buddhikot et al. |
| 2006/0098606 A1 | 5/2006 | Pandey et al. |
| 2006/0126493 A1 | 6/2006 | Hashem et al. |
| 2006/0164969 A1 | 7/2006 | Malik et al. |
| 2006/0218269 A1 | 9/2006 | Iwamura |
| 2006/0227729 A1 | 10/2006 | Budampati et al. |
| 2006/0233203 A1 | 10/2006 | Iwamura |
| 2006/0233266 A1 | 10/2006 | Suetsugu |
| 2006/0256881 A1 | 11/2006 | Yonge, III et al. |
| 2007/0013419 A1 | 1/2007 | Ayyagari et al. |
| 2007/0025266 A1 | 2/2007 | Riedel et al. |
| 2007/0025383 A1 | 2/2007 | Katar et al. |
| 2007/0025384 A1 | 2/2007 | Ayyagari et al. |
| 2007/0025386 A1 | 2/2007 | Riedel et al. |
| 2007/0025391 A1 | 2/2007 | Yonge, III |
| 2007/0025398 A1 | 2/2007 | Yonge, III |
| 2007/0026794 A1 | 2/2007 | Ayyagari et al. |
| 2007/0058659 A1 | 3/2007 | Ayyagari et al. |
| 2007/0058661 A1 | 3/2007 | Chow |
| 2007/0058732 A1 | 3/2007 | Riedel et al. |
| 2007/0060141 A1 | 3/2007 | Kangude et al. |
| 2007/0091925 A1 | 4/2007 | Miyazaki et al. |
| 2007/0127381 A1 | 6/2007 | Oh et al. |
| 2007/0147322 A1 | 6/2007 | Agrawal et al. |
| 2007/0230497 A1 | 10/2007 | Choi et al. |
| 2007/0237070 A1 | 10/2007 | Geile et al. |
| 2007/0248089 A1 | 10/2007 | Redi et al. |
| 2008/0095126 A1 | 4/2008 | Mahany et al. |
| 2008/0117891 A1 | 5/2008 | Damnjanovic et al. |
| 2008/0132264 A1 | 6/2008 | Krishnamurthy et al. |
| 2008/0201503 A1 | 8/2008 | McKim et al. |
| 2009/0011782 A1 | 1/2009 | Yonge, III |
| 2009/0034552 A1 | 2/2009 | Yonge, III |
| 2009/0067389 A1 | 3/2009 | Lee et al. |
| 2009/0116461 A1 | 5/2009 | Yonge, III |
| 2009/0154487 A1 | 6/2009 | Ryan et al. |
| 2009/0207865 A1 | 8/2009 | Yonge, III |
| 2009/0238153 A1 | 9/2009 | Sim |
| 2009/0279638 A1 | 11/2009 | Kurobe et al. |
| 2010/0111099 A1 | 5/2010 | Yonge, III |
| 2011/0128973 A1 | 6/2011 | Yonge, III |

FOREIGN PATENT DOCUMENTS

| | | | |
|---|---|---|---|
| EP | 0818905 A2 | 1/1998 |
| EP | 1065818 A1 | 1/2001 |
| EP | 0844563 B1 | 1/2003 |
| EP | 1693998 A1 | 8/2006 |
| EP | 1748574 | 1/2007 |
| EP | 1748597 A1 | 1/2007 |
| EP | 1179919 | 7/2010 |
| JP | 3107317 A | 5/1991 |
| JP | 08265241 | 10/1996 |
| JP | 10503624 | 3/1998 |
| JP | 2000512450 A | 9/2000 |
| JP | 2002500388 A | 1/2002 |
| JP | 2002135177 A | 5/2002 |
| JP | 2003507930 A | 2/2003 |
| JP | 2004088180 A | 3/2004 |
| JP | 2005073240 A | 3/2005 |
| JP | 2005079615 | 3/2005 |
| JP | 2005529518 A | 9/2005 |
| JP | 2007509530 A | 4/2007 |
| WO | WO9528773 A1 | 10/1995 |
| WO | WO9634329 A1 | 10/1996 |
| WO | WO9748206 A1 | 12/1997 |
| WO | WO9857439 A1 | 12/1998 |
| WO | WO9857440 A2 | 12/1998 |
| WO | WO9934548 A2 | 7/1999 |
| WO | WO0072495 A2 | 11/2000 |
| WO | WO0113560 A1 | 2/2001 |
| WO | WO0118998 A1 | 3/2001 |
| WO | WO0182550 A2 | 11/2001 |
| WO | WO0206986 A2 | 1/2002 |
| WO | WO0213442 A2 | 2/2002 |
| WO | WO0241598 A2 | 5/2002 |
| WO | WO02103943 A1 | 12/2002 |
| WO | WO03015291 A2 | 2/2003 |
| WO | WO03026224 A1 | 3/2003 |
| WO | WO03100996 A2 | 12/2003 |
| WO | WO03104919 A2 | 12/2003 |
| WO | WO030103222 | 12/2003 |
| WO | WO2004038980 A2 | 5/2004 |
| WO | 2004095165 A2 | 11/2004 |
| WO | WO2004102893 A1 | 11/2004 |
| WO | WO2005015841 A1 | 2/2005 |
| WO | WO2005024558 A2 | 3/2005 |
| WO | WO2005039127 A1 | 4/2005 |
| WO | WO2005048047 A2 | 5/2005 |
| WO | WO2005062546 A1 | 7/2005 |
| WO | WO2007014319 A2 | 2/2007 |

OTHER PUBLICATIONS

Advisory Action for U.S. Appl. No. 11/388,584 dated Mar. 23, 2010.
Afkhamie et al., "An Overview of the upcoming HomePlug AV Standard", May 2005, IEEE 0-7803-8844-5/05, pp. 400-404.
Anuj Batra et al., TI Physical Layer Proposal for IEEE 802.15 Task Group 3A, May 14, 2003, IEEE, IEEE 802.15-03/142R2, pp. 1-76.
Applied Cryptography, Second Edition: protocols, algorithms, and source code in C, Bruce Schneier, 1996.
Ayyagari Deepak,"High Speed Home Networking for AV and IP Applications using existing Powerline Infrastructure,"Dec. 2004,p. 65-72,paras:[0001]&[0004],Sharp Technical Journal.
Baig Sobia, et al., "A Discrete Multitone Transceiver at the Heart of the PHY Layer of an In-Home Power Line Communication Local Area Network," IEEE Communications Magazine, Apr. 2003, pp. 48-53.
Benedetto S et al: "A soft-input soft-ouput maximum a posteriori (MAP) module to decode parallel and serial concatenated codes" TDA Progress Report, XX, XX, vol. 42, No. 127, Nov. 15, 1996, pp. 1-20, XP002959296.
Bertsekas, et al., Data Networks, Prentice Hall, Englewood Cliffs, NJ, Section 2.4.3 Selective Repeat ARQ (1992).
Blake et al., "An Architecture for Differentiated Services," RFC 2475, pp. 1-31, The Internet Society, Dec. 1998.
Bruschi Danilo, "Secure Multicast in Wireless Networks of Mobile Hosts: Protocols and Issues", 2002, Mobile Networks and Applications, pp. 503-511.
Bux, "Token-Ring Local-Area Networks and Their Performance," Procs. of the IEEE, vol. 77, No. 2, Feb. 1989.
Carrier sense multiple access with collision detection (CSMA/CD) access method and physical layer specifications, ISO/IEC 8802-3: 1996 International Standard (ANSI/IEEE Std 802.3).
Dube P, et al., "Queueing analysis of early message discard policy", Communications, 2002. ICC 2002. IEEE International Conference, vol. 4, Iss., 2002, pp. 2426-2430.

Ehrsam, et al., "A cryptographic key management scheme for implementing the Data Encryption Standard," IBM Syst J, vol. 17, No. 2 (1978).
Final Office action for U.S. Appl. No. 11/388,584 dated Jan. 13, 2010.
Final Office action for U.S. Appl. No. 11/388,584 dated Jan. 7, 2009.
Final Office action for U.S. Appl. No. 11/388,869 dated Jan. 14, 2010.
Final Office action for U.S. Appl. No. 11/421,155 dated Aug. 12, 2009.
Final Office action for U.S. Appl. No. 11/420,432, dated Nov. 23, 2009.
Final Office action for U.S. Appl. No. 11/420,432 mailed Aug. 31, 2010.
Goalic et al., "Real-Time Turbo-Decoding of Product Codes on a Digital Signal Processor," IEEE, pp. 624-628 (1997).
HiPerformance Radio Local Area Network (HiperLAN) Type I: Functional Specification, European Standard (Telecommunication Series) No. 300652 V. 1.2.1 Jul. 1998.
HomePlug Powerline Alliance, HomePlug 1.0.1 Specification, Dec. 1, 2001.
HomePlug Powerline Alliance Inc., "HomePlug AV White Paper," Doc. Ver. No. HPAVWP—050818, Aug. 2005, pp. 1-11.
IBM, Combined use of collision resolution and collision avoidance MAC protocols, Oct. 1, 1994, IBM Technical Disclosure Bulletin, vol. 37, pp. 299-302 (NN9410299).
Interface Specification for HomePNA.TM. 2.0—10M8 Technology—Link Layer Protocols, Dec. 1, 1999.
International Search Report dated Apr. 30, 2008 referencing PCT Appliction No. PCT/US2007/085189 12 pages.
ISO/IEC 8802-11: 1999 International Standard (ANSI/IEEE Std802.11) Wireless LAN Medium Access Control (MAC) and Physical Layer (PHY) specifications.
ISO/IEC 8802-3: 2002 International Standard (ANSI/IEEE Std 802.3) Carrier sense multiple access with collision detection (CSMA/CD) access method and physical layer specifications.
Jeon, Wha Sook, Dong Geun Jeong, Chong-Ho Choi, "An Integrated Services MAC Protocol for Local Wireless Communications," Feb. 1, 1998, IEEE Transactions on Vehicular Technology, vol. 47, pp. 352-364.
Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.
Katar et al., "Beacon Schedule Persistence to Mitigate Beacon Loss in HomePlug AV Networks," May 2006, IEEE 1-4244-0113-05/06, pp. 184-188.
Korean Office Action with English Summary of Office Action issued in Korean Application No. 10-2006-7012758, dated Mar. 7, 2011, 5 pages.
Lee et al., "HomePlug 1.0 powerline communication LANs—protocol description and performance results", Int. J. Commun. Syst., vol. 16 (2003).
Lee et al., "HomePlug 1.0 Powerline Communication LANs-Protocol Description and Performance Results version 5.4," 2000, International Journal of Communication Systems, 2000 00: 1-6, pp. 1-25.
Non-Final Office action for U.S. Appl. No. 11/388,584, dated Jun. 25, 2009.
Non-Final Office action for U.S. Appl. No. 11/388,584, dated Oct. 6, 2008.
Non-Final Office action for U.S. Appl. No. 11/388,869 dated Jul. 7, 2010.
Non-Final Office action for U.S. Appl. No. 11/388,869 dated Jun. 10, 2009.
Non-Final Office action for U.S. Appl. No. 11/420,945, dated Jan. 29, 2009.
Non-Final Office action for U.S. Appl. No. 11/420,945, dated Jul. 8, 2009.
Non-Final Office action for U.S. Appl. No. 11/421,155 dated Feb. 23, 2009.
Non-Final Office action for U.S. Appl. No. 11/421,155 dated Mar. 2, 2010.
Non-Final Office action for U.S. Appl. No. 11/420,432, dated Apr. 28, 2009.
Non-Final Office action for U.S. Appl. No. 11/420,432, dated Mar. 25, 2010.
Notice of Allowance for U.S. Appl. No. 11/420,945 dated May 5, 2010.
Notice of Allowance for U.S. Appl. No. 12/728,040 dated Aug. 23, 2010.
Notice of Allownace for U.S. Appl. No. 12/728,040 dated Aug. 23, 2010.
Notice of Allownace for U.S. Appl. No. 11/421,155 dated Aug. 5, 2010.
Notice of Pre-Appeal Brief for U.S. Appl. No. 11/388,584 dated Jun. 16, 2010.
Notification of First Office Action, The State Intellectual Property Office of the People's Republic of China, issued in Chinese Application No. 200610107587.1, dated Oct. 11, 2010, 6 pages.
Notification of Reasons for Rejection, Japanese Patent Office, issued in Japanese Patent Application No. 2006-205200, dated Jan. 18, 2011, 3 pages.
Pavlidou, et al., "Power Line Communications: State of the Art and Future Trends." IEEE Communications Magazine, Apr. 2003, pp. 34-40.
PCT International Search Report for Appliction No. PCT/US2006/029718; dated Sep. 21, 2007.
Peterson et al., "Error-Correcting Codes", Second Edition, The Massachusetts Institute of Technology Press, 1972, pp. 212-213, 261-263, 362.
PKCS #5 v. 20: Password-Based Cryptography Standard RSA Laboratories, Mar. 25, 1999.
Pyndiah, "Near Optimum Decoding of Product Codes," IEEE, pp. 339-343 (1994).
Pyndiah, "Near-Optimum Decoding of Product Codes: Block Turbo Codes", IEEE Transactions on Communications, IEEE Service Center, Piscataway, NJ, US, vol. 46, No. 8, Aug. 1, 1998, pp. 1003-1010.
Pyndiah, "Performance of Block Turbo Coded 16-QAM and 64-QAM Modulations," IEEE, pp. 1039-1043 (1995).
Ruiz, David, et al., "In-Home AV PLC MAC with Neighboring Networks Support," IEEE, 2005, p. 17, rt. hand column, line 14-p. 20,rt. hand column, line 16; and Figs. 2,3,& 6.
Schneier, Bruce, "Applied Cryptography,"1996, John Wiley & Sons, Inc., Second Edition, pp. 34-38, pp. 48-49, pp. 513-514, and pp. 518-520.
Shared Wireless Access Protocol (Cordless Access) Specification, SWAP-CA Revision 1.21, Jan. 27, 1999, by the HomeRFTm Technical Committee.
Sun et al., Public-key ID-based Cryptosystem, 1991, IEEE, pp. 142-144.
Supplementary European Search Report—EP06788301—Search Authority—Munich—Apr. 14, 2010.
Wang, Contribution to the TG3 and TG4 MAC: MPDU Formats, May 10, 2001, Wi-LAN Inc., IEEE 802.16 Broadband Wireless Access Working Group <http://ieee802.org/16>.
"Programmable PSD Mask", V1.1.1 (Feb. 2006); Proposed Technical Specification, European Telecommunications Standards Institute, available prior to Jun. 2006.
PCT International Search Report for Application No. PCT/US06/29818; dated Sep. 21, 2007.
Programmable PSD Mask, V1.1.1 (Feb. 2006); Proposed Technical Specification, European Telecommunications Standards Institute, available prior to Jun. 2006, 10 pages.
International Search Report and Written Opinion for Application No. PCT/US2007/85189 dated Apr. 30, 2008, 12 pages.
International Search Report and Written Opinion for Application No. PCT/US06/29718 dated Sep. 21, 2007, 10 pages.
International Search Report and Written Opinion—PCT/US2008/065831, International Searching Authority, European Patent Office, Feb. 20, 2009, 22 pages.
International Search Report from PCT application No. PCT/US06/29377, dated Sep. 25, 2007, 9 pages.
"U.S. Appl. No. 11/337,946 Office Action", Jan. 26, 2009, 23 pages.
"U.S. Appl. No. 11/337,963 Office Action", Feb. 6, 2009, 17 pages.
"U.S. Appl. No. 11/492,487 Office Action", Jun. 23, 2009, 13 pages.
"U.S. Appl. No. 11/492,487 Final Office Action", Mar. 9, 2010, 15 pages.

"U.S. Appl. No. 11/492,505 Final Office Action", Jan. 14, 2010, 18 pages.
"U.S. Appl. No. 11/492,505 Office Action", Jun. 25, 2009, 14 pages.
"U.S. Appl. No. 11/492,505 Office Action", Mar. 3, 2011, 16 pages.
"U.S. Appl. No. 11/492,505 Office Action", Oct. 19, 2011, 19 pages.
"U.S. Appl. No. 11/492,505 Final Office Action", May 21, 2012, 16 pages.
"U.S. Appl. No. 11/492,506 Final Office Action", Oct. 28, 2009, 10 pages.
"U.S. Appl. No. 11/492,506 Final Office Action", Aug. 30, 2010, 13 pages.
"U.S. Appl. No. 11/492,506 Office Action", May 29, 2012, 11 pages.
"U.S. Appl. No. 11/492,506 Office Action", Apr. 3, 2009, 14 pages.
"U.S. Appl. No. 11/492,506 Office Action", Feb. 19, 2010, 8 pages.
"U.S. Appl. No. 11/493,382 Final Office Action", Jan. 6, 2010, 12 pages.
"U.S. Appl. No. 11/493,382 Office Action", Mar. 17, 2011, 11 pages.
"U.S. Appl. No. 11/493,382 Office Action", May 15, 2009, 13 pages.
"U.S. Appl. No. 11/493,382 Office Action", Jun. 25, 2010, 15 pages.
"U.S. Appl. No. 12/431,433 Final Office Action", Sep. 13, 2010, 9 pages.
"U.S. Appl. No. 12/431,433 Office Action", May 25, 2010, 11 pages.
"U.S. Appl. No. 12/628,507 Final Office Action", May 2, 2011, 13 pages.
"U.S. Appl. No. 12/628,507 Office Action", Sep. 27, 2010, 35 pages.

* cited by examiner

MANAGING SPECTRA OF MODULATED SIGNALS IN A COMMUNICATION NETWORK

PRIORITY INFORMATION

This application is a continuation of U.S. application Ser. No. 11/493,382, titled MANAGING SPECTRA OF MODULATED SIGNALS IN A COMMUNICATION NETWORK, by Lawrence W. Yonge III, which was filed on Jul. 26, 2006 now U.S. Pat. No. 8,175,190, which claims priority to U.S. Application Ser. No. 60/702,717, titled POWERLINE NETWORK MANAGEMENT AND CONTROL by Lawrence W. Yonge III, and filed on Jul. 27, 2005, and U.S. Application Ser. No. 60/705,720, titled COMMUNICATING IN A NETWORK THAT INCLUDES A MEDIUM HAVING VARYING TRANSMISSION CHARACTERISTICS by Yiorgos M. Peponides et al. and filed on Aug. 2, 2005, each of which is incorporated herein by reference as though fully and completely set forth herein.

TECHNICAL FIELD

The invention relates to managing spectra of modulated signals in a communication network.

BACKGROUND

Various types of communication systems transmit signals that may radiate in a portion of the electromagnetic spectrum and cause interference with devices that operate in that portion of the electromagnetic spectrum (e.g., radio frequency (RF) spectral bands). In some cases regulatory requirements for certain geographical regions (e.g., imposed by governments) place constraints on power that may be radiated in certain spectral regions, such as amateur radio bands. Some systems are wireless systems that communicate between stations using radio waves modulated with information. Other systems are wired systems that communicate using signals transmitted over a wired medium, but the wired medium may radiate enough power in restricted spectral bands to potentially cause interference.

Communication stations can be configured to avoid using or limit the amount of power that is radiated in certain restricted spectral bands. Alternatively, communication stations can be configured to adjust the spectral regions used for communication, based on whether the station is operating in an environment in which interference may occur. For example, orthogonal frequency division multiplexing (OFDM), also known as Discrete Multi Tone (DMT), is a spread spectrum signal modulation technique in which the available bandwidth is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM). An example of a system in which carriers can be disabled to avoid potential interference is described in more detail in U.S. Pat. No. 6,278,685, incorporated herein by reference. In this system, after one or more carriers are disabled, the modulation functions (e.g., an interleaver shift mechanism) are adjusted for a different number of usable carriers.

SUMMARY

In one aspect, in general, the invention features a method that includes modulating information onto frequency components of a signal. The resulting modulated signal includes at least some redundancy in frequency enabling a portion of the information modulated onto selected frequency components to be recovered from fewer than all of the selected frequency components. The method includes controlling the spectrum of the modulated signal, including enabling the amplitude of at least some frequency components of the modulated signal to be set below a predetermined amplitude used for modulating the information.

Aspects of the invention may include one or more of the following features.

Modulating the portion of the information onto selected frequency components comprises modulating redundant data from which the portion of the information can be decoded onto respective frequency components having different center frequencies.

The signal comprises a plurality of symbols, and at least some of the respective frequency components are in different symbols.

The redundant data comprises one or more encoded bits associated with the information.

The one or more encoded bits comprise data bits representing the information.

The one or more encoded bits comprise parity bits used for decoding the information.

The center frequencies are spread approximately uniformly over most of a set of frequency components available for modulating the information.

The method further comprises transmitting the modulated signal from a first node to a second node.

The first node and the second node each stores information identifying a set of frequency components available for modulating the information.

The second node is able to recover the portion of the information without needing to receive information from the first station indicating whether any of the selected frequency components have been set below the predetermined amplitude used for modulating the information.

The method further comprises demodulating each of the selected frequency components, and using resulting demodulated information to recover the portion of the information.

Recovering the portion of the information comprises decoding the demodulated information.

The amplitude of at least one of the selected frequency components has been set below the predetermined amplitude used for modulating the information.

The predetermined amplitude used for modulating the information comprises an amplitude corresponding to a phase shift keying modulation constellation.

The predetermined amplitude used for modulating the information comprises one of a plurality of amplitudes corresponding to a quadrature amplitude modulation constellation.

Setting the amplitude of one of the frequency components below the predetermined amplitude used for modulating the information comprises setting the amplitude of the frequency component below a limit based on a constraint on power that can be radiated in a portion of the spectrum of the modulated signal in which the frequency component is located.

The constraint on the power is based on a prohibition from interfering with a licensed entity.

The method further comprises setting the amplitude of the frequency component below the limit in response to detecting a transmission from the licensed entity.

Setting the amplitude of one of the frequency components below the predetermined amplitude used for modulating the information comprises turning off the frequency component.

The method further comprises selecting the frequency components of the signal according to a set of available frequencies that excludes at least some frequencies in a range of frequencies.

The excluded frequencies correspond to frequencies that are likely to interfere with licensed entities in a region.

In another aspect, in general, the invention features a transmitter. The transmitter includes an encoder module including circuitry to redundantly encode information to be modulated onto frequency components of a signal, the resulting modulated signal including at least some redundancy in frequency enabling a portion of the information modulated onto selected frequency components to be recovered from fewer than all of the selected frequency components. The transmitter also includes a spectral shaping module including circuitry to control the spectrum of the modulated signal, including enabling the amplitude of at least some frequency components of the modulated signal to be set below a predetermined amplitude used for modulating the information.

Among the many advantages of the invention (some of which may be achieved only in some of its various aspects and implementations) are the following.

The amplitude mask technique can be used to preserve interoperability between a user's local network (e.g., a home powerline network of devices such as computer, Ethernet bridge, TV, DVR, etc.) and an access network of a service provider, for example. The service provider may need to limit power radiated in a given spectral band due a constraint such as a prohibition from interfering with a licensed entity. The Federal Communications Commission (FCC) may require that the service provider be able to have a way to stop transmitting power in a given spectral band if they interfere with a licensed entity such as an amateur radio device or a radio station, for example. The amplitude mask technique enables the service provider to adjust the transmitted spectrum while preserving communication without the need to negotiate a change in modulation scheme with receiving stations.

For example, if a service provider is already communicating with a user's device using a given set of carriers, and the service provider needs to turn off one or more of the carriers, the amplitude mask technique enables the service provider to stop radiating power on an interfering carrier while still using that carrier in a modulation scheme agreed upon with the user station. Since the amplitude mask changes the amplitude of selected carriers but does not eliminate those carriers from the modulation scheme, the amplitude mask technique avoids the communication overhead of updating modulation parameters (e.g., the tone mask) before adjusting the transmitted spectrum.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
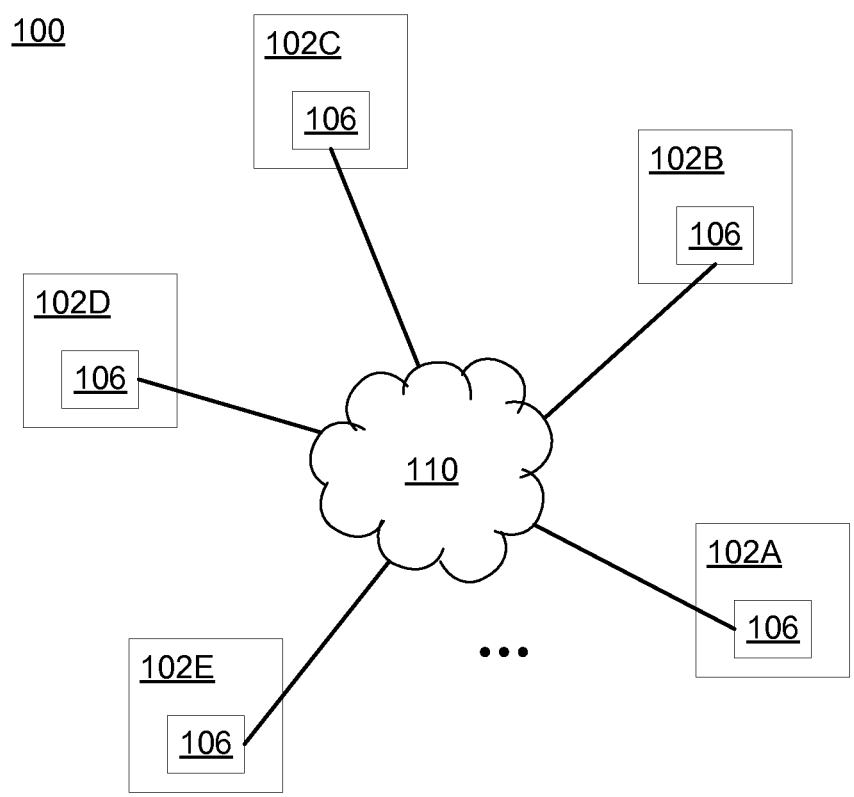
FIG. 1 is a schematic diagram of a network configuration.

As shown in FIG. 1, a network configuration 100 provides a shared communication medium 110 for a number of communication stations 102A-102E (e.g., computing devices, or audiovisual devices) to communicate with each other. The communication medium 110 can include one or more types of physical communication media such as coaxial cable, unshielded twisted pair, power lines, or wireless channels for example. The network configuration 100 can also include devices such as bridges or repeaters. The communication stations 102A-102E communicate with each other using predetermined physical (PHY) layer and medium access control (MAC) layer communication protocols used by network interface modules 106. The MAC layer is a sub-layer of the data link layer and provides an interface to the PHY layer, according to the Open Systems Interconnection (OSI) network architecture standard, for example. The network configuration 100 can have any of a variety of network topologies (e.g., bus, tree, star, mesh).

The stations use an amplitude mask technique, described in more detail below, for managing the spectra of modulated signals without needing to exchange information among stations indicating which carriers are in use or disabled. The amplitude mask technique is used with a redundant coding scheme that spreads data over multiple carriers so that the station can control the spectrum of modulated signals with a high likelihood that the modulated data can be recovered using redundant information.

In some implementations, the network interface modules 106 use protocols that include features to improve performance when the network configuration 100 includes a communication medium 110 that exhibits varying transmission characteristics. For example, the communication medium 110 may include AC power lines in a house, optionally coupled to other media (e.g., coaxial cable lines).

Power-line communication systems use existing AC wiring to exchange information. Owing to their being designed for much lower frequency transmissions, AC wiring provides varying channel characteristics at the higher frequencies used for data transmission (e.g., depending on the wiring used and the actual layout). To increase the data rate between various links, stations adjust their transmission parameters dynamically. This process is called channel adaptation. Channel adaptation results in adaptation information specifying a set of transmission parameters that can be used on each link. Adaptation information includes such parameters as the frequencies used, their modulation, and the forward error correction (FEC) used.

The communication channel between any two stations provided by the communication medium 110 may exhibit varying channel characteristics such as periodic variation in noise characteristics and frequency response. To improve performance and QoS stability in the presence of varying channel characteristics, the stations can synchronize channel adaptation with the frequency of the AC line (e.g., 50 or 60 Hz). There are typically variations in the phase and frequency of the AC line cycle from the power generating plant and local noise and load changes. This synchronization enables the stations to use consistent channel adaptation optimized for a particular phase region of the AC line cycle. An example of such synchronization is described in U.S. patent application Ser. No. 11/337,946, incorporated herein by reference.

Another aspect of mitigating potential impairments caused by the varying channel characteristics involves using a robust signal modulation format such as OFDM. An exemplary communication system that uses OFDM modulation is described below.

Any of a variety of communication system architectures can be used to implement the portion of the network interface module 106 that converts data to and from a signal waveform that is transmitted over the communication medium. An application running on a station provides and receives data to and from the network interface module 106 in segments. A "MAC Protocol Data Unit" (MPDU) is a segment of information including overhead and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line.

In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f = 1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
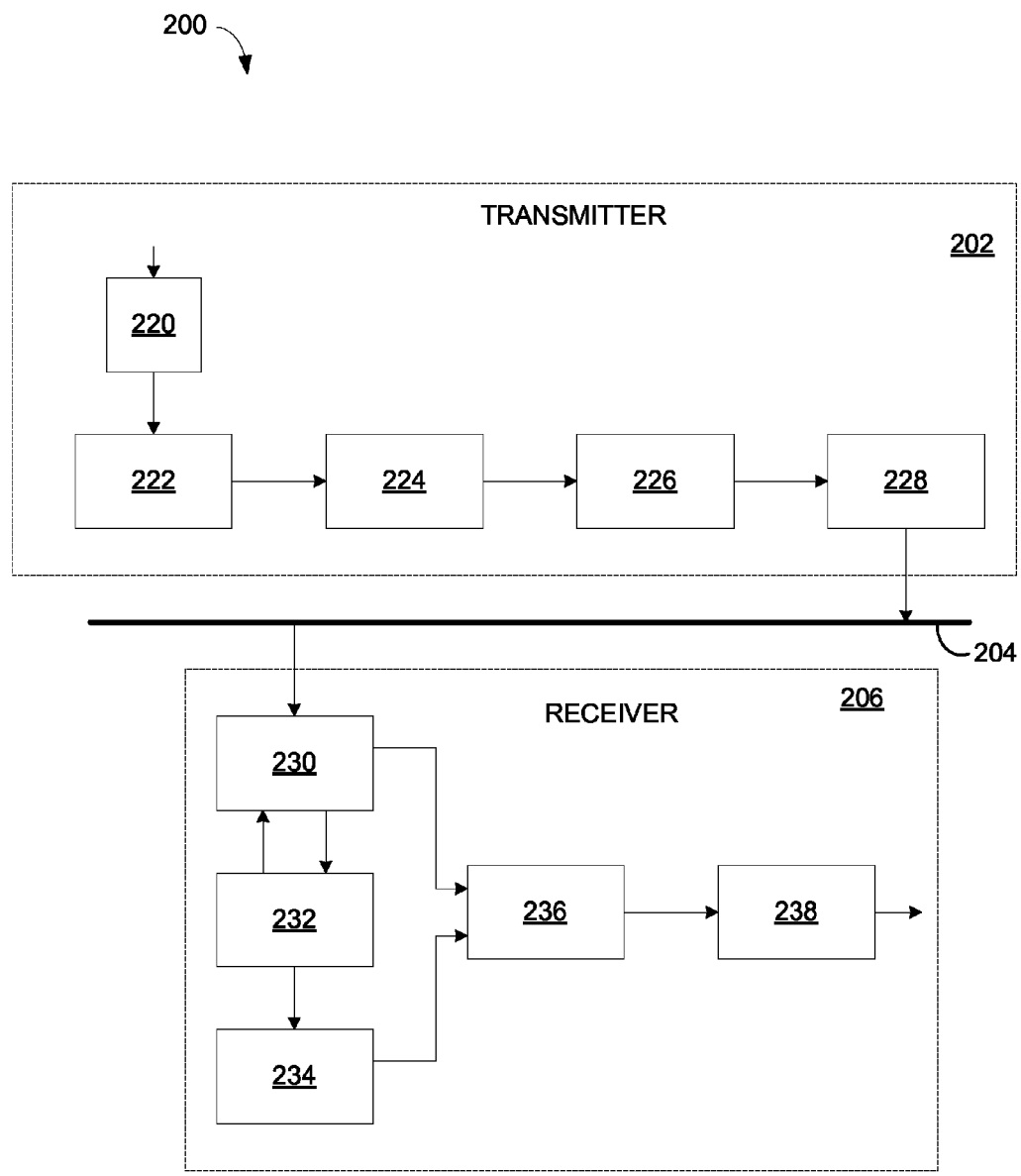
FIG. 2 is a block diagram of a communication system.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module 106 at each station. The communication medium 204 represents a path from one station to another over the communication medium 110 of the network configuration 100.

Figure 3:
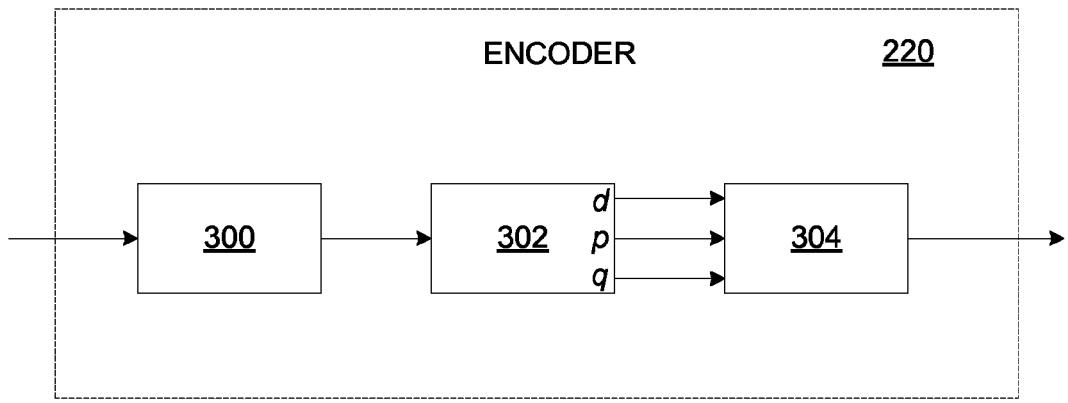
FIG. 3 is a block diagram of an encoder module.

At the transmitter 202, modules implementing the PHY layer receive an MPDU from the MAC layer. The MPDU is sent to an encoder module 220 to perform processing such as scrambling, error correction coding and interleaving. Referring to FIG. 3, an exemplary encoder module 220 includes a scrambler 300, a Turbo encoder 302, and an interleaver 304.

The scrambler 300 gives the information represented by the MPDU a more random distribution (e.g., to reduce the probability of long strings of zeros or ones). In some implementations, the data is "XOR-ed" with a repeating Pseudo Noise (PN) sequence using a generator polynomial such as:

$$S(x) = x^{10} + x^3 + 1$$

The state bits in the scrambler 300 are initialized to a predetermined sequence (e.g., all ones) at the start of processing an MPDU.

Scrambled information bits from the scrambler 300 can be encoded by an encoder that uses any of a variety of coding techniques (e.g., convolutional codes). The encoder can generate a stream of data bits and in some cases auxiliary information such as one or more streams of parity bits. In this example, the Turbo encoder 302 uses a Turbo code to generate, for each block of m input information bits, a block of m "data bits" (d) that represent the input information, a first block of n/2 "parity bits" (p) corresponding to the information bits, and a second block of n/2 parity bits (q) corresponding to a known permutation of the information bits. Together, the data bits and the parity bits provide redundant information that can be used to correct potential errors. This scheme yields a code with a rate of m/(m+n).

The interleaver 304 interleaves the bits received from the Turbo encoder 302. The interleaving can be performed, for example on blocks corresponding to predetermined portions of an MPDU. The interleaving ensures that the redundant data and parity bits for a given block of information are distributed in frequency (e.g., on different carriers) and in time (e.g., on different symbols) to provide the ability to correct errors that occur due to localized signal interference (e.g., localized in time and/or frequency). The signal interference may be due to a jammer or may be due to spectral shaping of the spectral shaping module 400 described below. The interleaving can ensure that the redundant information for a given portion of the MPDU is modulated onto carriers that are evenly distributed over the OFDM bandwidth so that limited bandwidth interference is not likely to corrupt all of the carriers. The interleaving can also ensure that the redundant information is modulated onto more than one symbol so that broadband but short duration interference is not likely to corrupt all of the symbols.

The encoder module 220 includes a buffer that can be used to temporarily store data and parity bits from the Turbo encoder 302, to be read out by the interleaver 304 in a different order than the order in which they were stored. For example, a buffer can include includes k "data sub-banks" of m/k bits each and k "parity sub-banks" of n/k bits each (e.g., the sub-banks can correspond to logical regions of memory). In the case of k=4, the data bits are divided into four equal sub-blocks of m/4 bits, and the parity bits are divided into 4 equal sub-blocks of n/4 bits (where both m and n are selected to be divisible by 4). The Turbo encoder 302 writes the first m/4 data bits (in natural order) to the first data sub-bank, the next m/4 data bits to the second data sub-bank, and so on. The Turbo encoder 302 writes the first n/4 parity bits (in natural order) to the first parity sub-bank, the next n/4 parity bits to the second parity sub-bank, and so on.

The interleaver 304 generates a stream of bits to be modulated onto carriers of data symbols by reading from the sub-banks in a predetermined order. For example, the four data sub-banks of length m/4 may be thought of as a matrix consisting of m/4 rows and four columns, with column 0 representing the first sub-bank, column 1 representing the second sub-bank, and so on. Groups of four bits on the same row (one bit from each sub-block) are read out from the matrix at a time, starting with row 0. After a row has been read out, a row pointer is incremented by StepSize before performing the next row read. After m/4/StepSize row reads, the end of the matrix has been reached. The process is then repeated for different rows until all bits from the matrix have been read out. The parity bits can be interleaved in a similar manner. In some implementations, the data bits and the parity bits can also interleaved with each other in a predetermined manner.

In some modes of communication, called ROBO modes, the interleaver 304 performs additional processing to generate increased redundancy in the output data stream. For example, ROBO mode can introduce further redundancy by reading each sub-bank location multiple times at different cyclic shifts to represent each encoded bit by multiple bits at the output of the interleaver 304.

Other types of encoders and/or interleavers can be used that also provide redundancy to enable each portion of an MPDU to be recovered from fewer than all of the modulated carriers or fewer than all of the modulated symbols.

Referring again to FIG. 2, the encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ (or "tones") within the OFDM bandwidth are used by the system 200 to transmit information according to a "tone mask." For example, some carriers that are likely to interfere with licensed entities in a particular region (e.g., North America) can be avoided, and no power is radiated on those carriers. Devices sold in a given region can be programmed to use a tone mask configured for that region. The mapping module 222 also determines the type of modulation to be used on each of the carriers in the tone mask according to a "tone map." The tone map can be a default tone map (e.g., for redundant broadcast communication among multiple stations), or a customized tone map determined by a receiving station that has been adapted to characteristics of the communication medium 204 (e.g., for more efficient unicast communication between two stations). If a station determines (e.g., during channel adaptation) that a carrier in the tone mask is not suitable for use (e.g., due to fading or noise) the tone map can specify that the carrier is not to be used to modulate data, but instead can use pseudorandom noise for that carrier (e.g., coherent BPSK modulated with a binary value from a Pseudo Noise (PN) sequence). For two stations to communicate, they should use the same tone mask and tone map, or at least know what tone mask and tone map the other device is using so that the signals can be demodulated properly.

A modulation module 224 performs the modulation of the resulting set of N complex numbers (some of which may be zero for unused carriers) determined by the mapping module 222 onto N orthogonal carrier waveforms having peak frequencies $f_1, \ldots, f_N$. The modulation module 224 performs an inverse discrete Fourier transform (IDFT) to form a discrete time symbol waveform S(n) (for a sampling rate $f_R$), which can be written as $$S(n) = \sum_{i=1}^{N} A_i \exp[j(2\pi i n / N + \Phi_i)] \quad \text{Eq. (1)}$$

where the time index n goes from 1 to N, $A_i$ is the amplitude and $\Phi_i$ is the phase of the carrier with peak frequency $f_i = (i/N) f_R$, and $j = \sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

The modulation module 224 or the post-processing module 226 can include a spectral shaping module that further modifies the spectrum of a signal that includes modulated symbols according to an "amplitude mask." While the tone mask can be changed by exchanging messages among stations in a network, the amplitude mask enables a station to attenuate power transmitted on certain carriers without needing to exchange messages among the stations. Thus, the spectral shaping module enables dynamic spectral shaping in response to dynamic spectral constraints by changing the amplitude of carriers that may cause interference. In some cases, the spectral shaping module sets the amplitude of the frequency component below a predetermined limit in response to an event such as detecting a transmission from a licensed entity.

Figure 4:
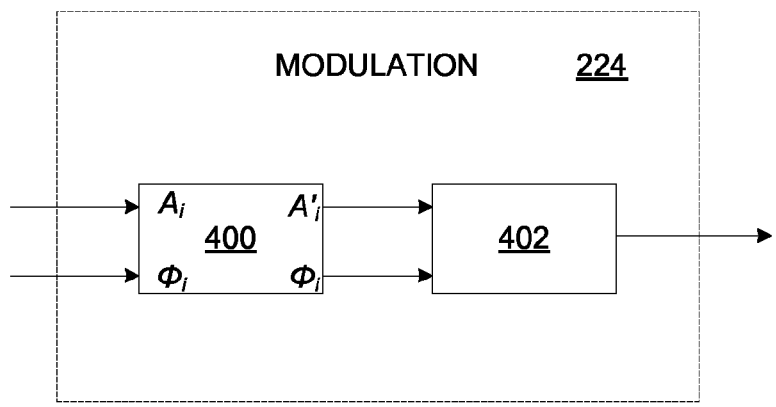
FIG. 4 is a block diagram of a modulation module.

Referring to FIG. 4, an exemplary implementation of the modulation module 224 includes a spectral shaping module 400 coupled to an IDFT module 402. The spectral shaping module 400 modifies the amplitude $A_i$ for the carriers that are to be attenuated, providing an attenuated amplitude $A'_i$ to the IDFT module 402. The value of the phase and $\Phi_i$ for the attenuated carriers can be passed through the spectral shaping module 400 without modification. Thus, in this example, the IDFT module 402 performs a discrete Fourier transform that includes the attenuated carrier frequencies.

The amplitude mask specifies an attenuation factor $\alpha$ for the amplitude $A'_i = \alpha A_i$ according to the amount by which the power is to be attenuated (e.g., 2 dB in amplitude for each 1 dB in power). The amplitude $A'_i$ is set below a predetermined amplitude that is normally used for modulating the information (e.g., according to a predetermined constellation) such that the resulting radiated power does not interfere with other devices. The amplitude mask entry may also indicate that a carrier is to be nulled completely with the corresponding amplitude set to zero. The attenuated carriers are still processed by the receiving station even if they are transmitted with zero amplitude so that the modulation and encoding scheme is preserved.

Generally, for two stations to communicate, they don't necessarily need to know what amplitude mask the other station is using (or whether the station is using an amplitude mask at all). Even though no modification of the modulation scheme between a transmitter and a receiver is necessary to partially attenuate or fully attenuate (i.e., turn off) a carrier using the amplitude mask, in some cases, when a receiving station updates a tone map (which determines how carriers within the tone mask are to be modulated) the receiving station will detect a very poor signal-to-noise ratio on the attenuated carriers and may exclude them from the updated tone map (indicating that those carriers are not to be used for modulating data).

In alternative implementations, the spectral shaping module can be included in the post-processing module 226, for example, as a programmable notch filter that reduces the amplitude of one or more narrow frequency bands in the signal.

An Analog Front End (AFE) module 228 couples an analog signal containing a continuous-time (e.g., low-pass filtered) version of the symbol set to the communication medium 204.

The effect of the transmission of the continuous-time version of the waveform S(t) over the communication medium 204 can be represented by convolution with a function g(τ;t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including deinterleaving, error correction, and descrambling). The data that was modulated onto carriers that were subsequently attenuated by the spectral shaping module 400 can be recovered due to the redundancy in the encoding scheme.

Any of the modules of the communication system 200 including modules in the transmitter 202 or receiver 206 can be implemented in hardware, software, or a combination of hardware and software.

Many other implementations of the invention other than those described above are within the invention, which is defined by the following claims.

What is claimed is:

1. A method for operating a communicating station in order to transmit information through a communication medium using a set of channels, wherein the channels have respective carrier frequencies, the method comprising:
   determining a list of one or more of the carrier frequencies over which transmissions are to be attenuated;
   encoding information bits according to an error correction code in order to obtain coded bits, wherein the coded bits represent the received information bits with redundancy;
   interleaving the coded bits to obtain interleaved bits;
   mapping blocks of the interleaved bits to corresponding sets of complex numbers, wherein each set of complex numbers includes one complex number for each of the carrier frequencies;
   modifying each set of complex numbers by attenuating one or more of the complex numbers in the set that correspond to the one or more carrier frequencies on the list, wherein said attenuating includes scaling the one or more complex numbers so that their amplitudes are less than a predetermined amplitude level;
   computing an inverse Fourier transform of each modified set of complex numbers to obtain a sequence of time-domain samples; and
   transmitting a time-domain signal over the communication medium based on the sequence of time-domain samples.

2. The method of claim 1, wherein the one or more carrier frequencies on the list are determined without negotiating with any other communicating station over the communication medium.

3. The method of claim 1, wherein the one or more carrier frequencies on the list are determined without exchanging messages with any other communicating station over the communication medium.

4. The method of claim 1, wherein the list is not provided to a receiving station that receives and demodulates the time-domain signal.

5. The method of claim 1, wherein the predetermined amplitude level is zero.

6. The method of claim 1, wherein the predetermined amplitude level is an amplitude level that based on a regulatory limit for radiated power.

7. The method of claim 1, wherein the predetermined amplitude level is a level that ensures non-interference with one or more other communication stations.

8. The method of claim 1, wherein the said interleaving spreads coded bits across different blocks of the interleaved bits.

9. The method of claim 1, wherein said interleaving spreads coded bits over the carrier frequencies.

10. The method of claim 9, wherein said interleaving spreads coded bits uniformly over the carrier frequencies.

11. The method of claim 1, further comprising detecting transmission from another communication station over the communication medium, wherein said determining the list includes adding one or more of the carrier frequencies to the list in response to detecting said transmission.

12. The method of claim 1, wherein said mapping of blocks of the interleaved bits to corresponding sets of complex numbers includes applying a tone mask to avoid one or more frequencies specified by the tone mask, wherein one or more complex numbers in each set that correspond to the one or more specified frequencies are set to zero and are not determined by the interleaved bits, wherein the tone mask is determined by negotiation with another communication station over the communication medium.

13. The method of claim 1, further comprising:
   scrambling the information bits prior said encoding the information bits.

14. A communicating station including a system for transmitting information through a communication medium using a set of channels, wherein the channels have respective carrier frequencies, the system comprising:
   memory for storing a list of one or more of the carrier frequencies over which transmissions are to be attenuated;
   an encoding unit configured to encode information bits according to an error correction code in order to obtain coded bits, wherein the coded bits represent the received information bits with redundancy;
   an interleaver configured to interleave the coded bits to obtain interleaved bits;
   a modulation module configured to:
      map blocks of the interleaved bits to corresponding sets of complex numbers, wherein each set of complex numbers includes one complex number for each of the carrier frequencies;
      modify each set of complex numbers by attenuating one or more of the complex numbers in the set that correspond to the one or more carrier frequencies on the list, wherein said attenuating includes scaling the one or more complex numbers so that their amplitudes are less than a predetermined amplitude level; and
      compute an inverse Fourier transform of each modified set of complex numbers to obtain a sequence of time-domain samples.

15. The communicating station of claim 14, wherein the system is configured to determine the one or more carrier frequencies on the list without negotiating a change in modulation scheme with a receiving station over the communication medium.

16. The communicating station of claim 14, wherein the system is configured to determine the one or more carrier frequencies on the list without exchanging messages with any other communicating station over the communication medium.

17. The communicating station of claim 14, wherein the list is not provided to a receiving station that receives and demodulates the time-domain signal.

18. The communicating station of claim 14, wherein the predetermined amplitude level is zero.

19. The communicating station of claim 14, wherein the predetermined amplitude level is an amplitude level that based on a regulatory limit for radiated power.

20. The communicating station of claim 14, wherein the predetermined amplitude level is a level that ensures non-interference with one or more other communication stations.

21. The communicating station of claim 14, wherein the interleaver is configured to spread coded bits across different blocks of the interleaved bits.

22. The communicating station of claim 14, wherein said interleaver is configured to spread coded bits over the carrier frequencies.

23. The communicating station of claim 22, wherein said interleaver is configured to spread coded bits uniformly over the carrier frequencies.

24. The communicating station of claim 14, further comprising a receiver, wherein the communicating station is configured to add one or more of the carrier frequencies to the list in response to the receiver's detecting of a transmission from a licensed entity.

25. The communicating station of claim 14, wherein said modulation module is configured to apply a tone mask to avoid one or more frequencies specified by the tone mask, wherein one or more complex numbers in each set that correspond to the one or more specified frequencies are set to zero and are not determined by the interleaved bits, wherein the tone mask is determined by negotiation with another communication station over the communication medium.

26. The communicating station of claim 14, further comprising:
   a scrambler configured to scramble the information bits prior said encoding the information bits.

27. The communicating station of claim 14 further comprising:
   a front end configured to transmit a time-domain signal over the communication medium based on the sequence of time-domain samples.

* * * * *